United States Patent
Doose et al.

[15] 3,697,665
[45] Oct. 10, 1972

[54] POWER LINE SYSTEM AND METHOD FOR THE TRANSMISSION OF ELECTRIC ENERGY OVER LOW TEMPERATURE ELECTRIC CONDUCTORS

[72] Inventors: Conrad Doose; Wolfgang Sassin, both of Julich, Germany

[73] Assignee: Kernforschungsanlage Julich Gesellschaft mit beschrankter Haftung, Julich, Germany

[22] Filed: Dec. 15, 1970

[21] Appl. No.: 98,231

[30] Foreign Application Priority Data

Dec. 15, 1969   Germany..........P 19 62 745.3

[52] U.S. Cl.................174/15 C, 62/97, 174/DIG. 6
[51] Int. Cl...............................................H01b 7/34
[58] Field of Search....174/15 R, 15 C, 16 B, DIG. 6, 174/99 B; 69/97, 120, 122; 165/143, 144, 172, 177

[56] References Cited

UNITED STATES PATENTS

| | | | |
|---|---|---|---|
| 3,595,982 | 7/1971 | Kafka | 174/15 C |
| 3,529,071 | 9/1970 | Kafka | 174/15 C |
| 3,512,581 | 5/1970 | Lawton | 174/15 C X |
| 3,511,919 | 5/1970 | Miller | 174/15 C |
| 3,463,869 | 8/1969 | Cooley et al. | 174/15 C |
| 3,406,245 | 10/1968 | Watkins | 174/15 C |
| 3,363,046 | 1/1968 | Endacott | 174/15 C |
| 3,396,551 | 8/1968 | Dimentberg | 174/15 C X |
| 3,343,035 | 9/1967 | Garwin | 174/DIG. 6 |

FOREIGN PATENTS OR APPLICATIONS 1,167,054   10/1969   Great Britain...........174/15 C

*Primary Examiner*—Lewis H. Myers
*Assistant Examiner*—A. T. Grimley
*Attorney*—Edwin E. Greigg

[57] ABSTRACT

In a power line system for transmitting electric energy over electric conductors cooled by a coolant flowing in conduits associated with the conductors which, in turn, are surrounded by a radiation shield cooled by a coolant flowing in conduits associated with the radiation shield; the flow rate of the coolant through any cross-sectional area laid across all the first-named conduits, as well as the flow rate of the coolant through any cross-sectional area laid across all the second-named conduits is unequalized. Further, the power line system includes refrigeration machines to set to the optimal operating temperatures the coolant associated with the conductors and the coolant associated with the radiation shield.

6 Claims, 4 Drawing Figures

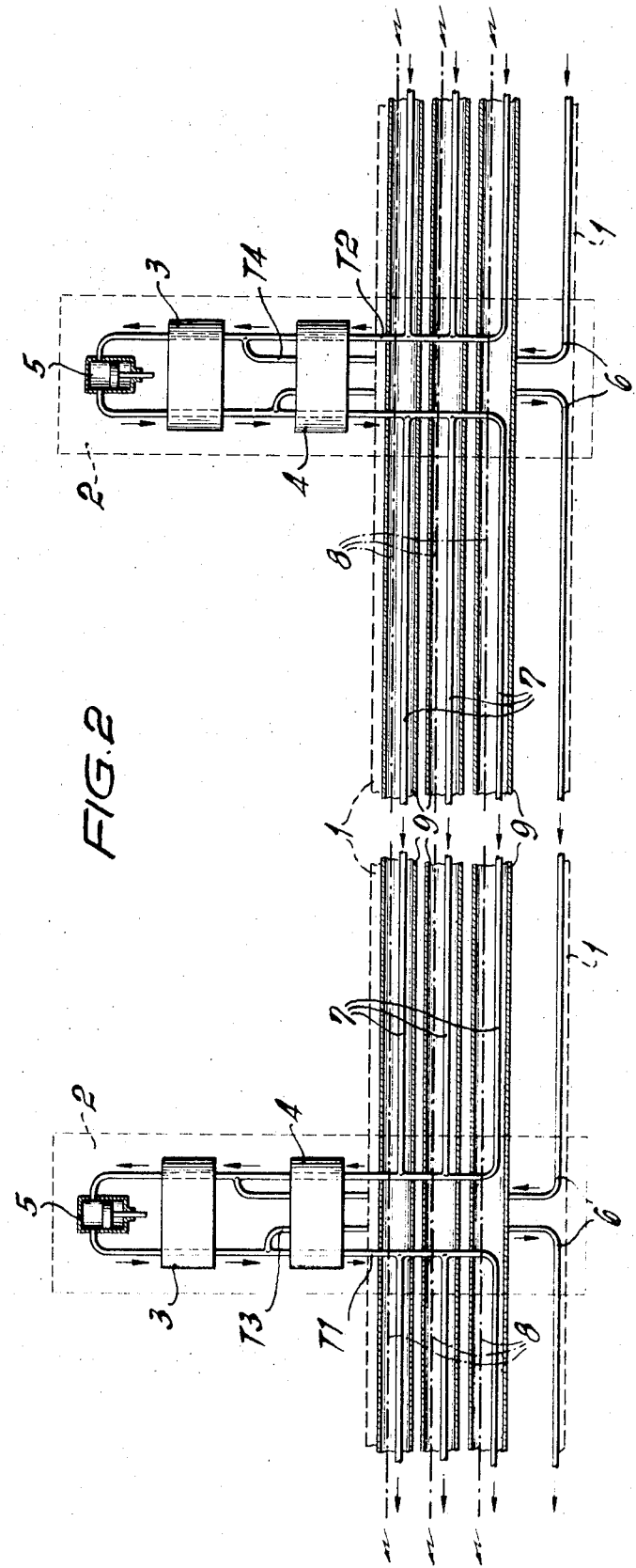

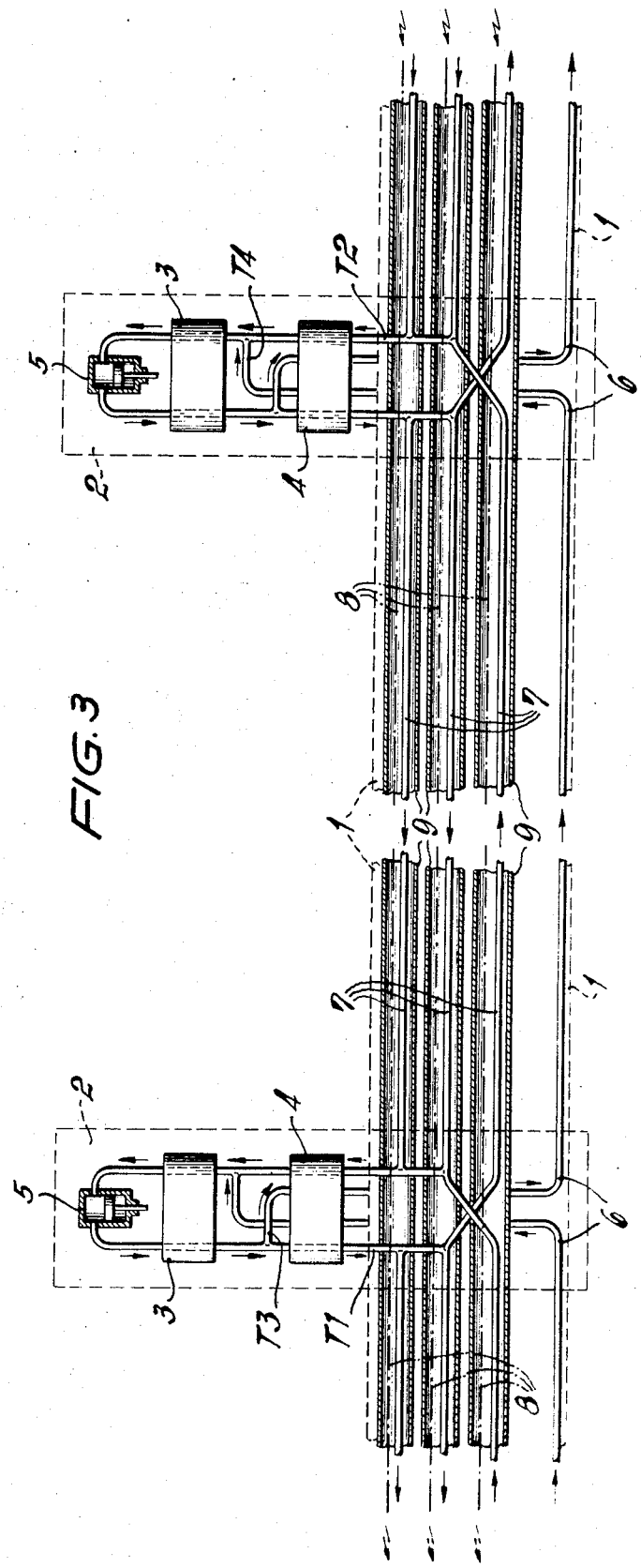

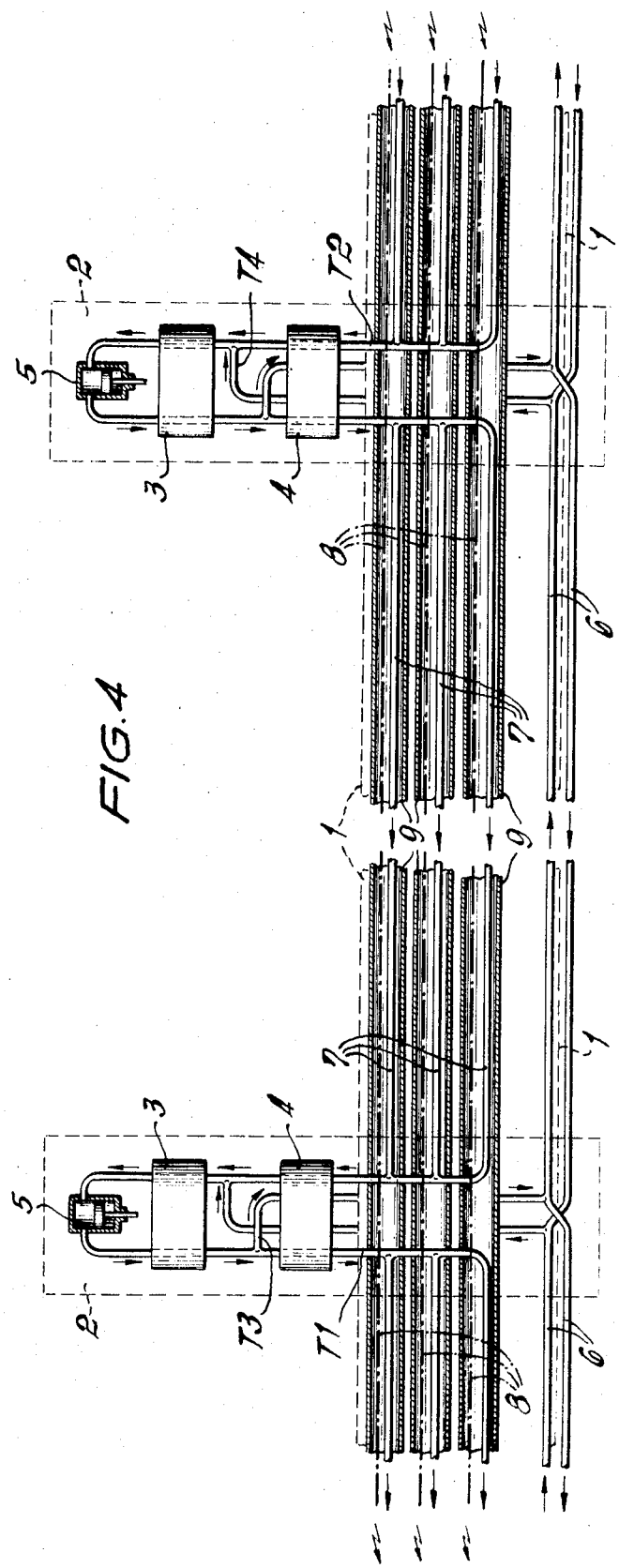

POWER LINE SYSTEM AND METHOD FOR THE TRANSMISSION OF ELECTRIC ENERGY OVER LOW TEMPERATURE ELECTRIC CONDUCTORS

BACKGROUND OF THE INVENTION

This invention relates to an electric power line system of the type wherein the electric conductors are disposed in or on tubular conduits through which a coolant passes, and which are arranged in a tubular vacuum casing. The conductors are surrounded by a radiation shield which is cooled by one or more tubular conduits. In such a power line system the electric conductors are cooled to very low temperatures (including the condition of superconductivity) by means of refrigerating machines each formed of a compressor, an expansion device, and heat exchanger means. The annular space defined by the tubular casing and the radiation shield is fully or partially filled with a heat reflecting insulating material.

There are known power line systems in which the electric forward and return conductors are arranged in a common vacuum casing. There are also known power line systems in which the individual electric conductors extend, together with a sole associated coolant conduit in vacuum casings which are separated from one another. In such power line systems the coolant streams are directed in such a manner that during normal operation, for each cross-sectional area of the power line, the following condition is met: The mass flow of coolant passing through such cross-sectional area in one direction is identical to the mass flow of coolant passing through the same cross-sectional area in the opposite direction. In case several coolants are used, this condition is fulfilled for each coolant separately.

Thus, for each coolant in each power line portion, at least one forward flow conduit and one return flow conduit is used. In power line systems of this type it is endeavored to optimalize the cooling of the electric conductors and the radiation shield; that is, to reduce the heat effects. Also, the flow looses have to be reduced to a minimum value. A further characteristic of known low temperature power cables is the use of one or more cold radiation shields which are cooled with at least one coolant other than the coolant used for cooling the electric conductors. For this purpose at least one additional coolant circuit is provided. While, for example, for the cooling of the electric conductors preferably helium is used, for the cooling of the radiation shield liquid hydrogen or liquid nitrogen may find application.

In power line systems known heretofore it is very disadvantageous that the coolant quantities flowing in the tubular conduits in the forward and in the return direction have to be identical and for each flow direction there have to be provided tubular conduits which are thermally insulated from one another. In this manner the number of coolant conduits is doubled, the diameters of the vacuum casing and the radiation shield, as well as the cold surfaces of the power line system and the number of the required, thermally insulating supports increase very significantly. The use of several refrigeration systems has further the disadvantage that none of the radiation shields is operated at its optimal temperature, but only in a narrow temperature range which is determined by the thermodynamic properties of the liquid gas used. In case of radiation shields where liquid $H_2$ and/or liquid $N_2$ is used, the operating temperature is in a narrow temperature rang of about 20° K and 77° K, respectively, whereas the cooling of these radiation shields would be optimal in a range from 30° to 60° K.

In case a radiation shield is used that is cooled with liquid hydrogen and/or liquid nitrogen, there is a further disadvantage in that for the radiation shields a plurality of coaxially arranged coolant conduits are necessary, contributing to the structural complexity of the power line system. This leads to difficulties during the installation and the repair of the power line system. Besides, a power line system of the aforenoted type is prone to malfunctioning. Also, attempts have been made to provide power line systems in which the electric conductors are maintained at low temperatures and in which one electric conductor, combined with the forward coolant conduit and the other electric conductor, combined with a separate return coolant conduit, are arranged in such a manner that each conduit is surrounded by a separate vacuum casing and installed as an independent cable. Although in this manner even in case of a three-phase current each individual strand may be constructed in a relatively simple manner, in such a structure, however, the costs for the required vacuum casings and installation are doubled or tripled. In addition, the costs for providing the cooling also increase in a very substantial extent because of the increase in the cold surfaces. Strong electric and magnetic fields which, because of the large lateral distances of the individual current conductors, do not cancel out by themselves, necessitate additional measures to maintain, for example, in case of transmitting alternating current, the eddy current losses at a permissible level.

If, on the other hand, the electric forward and return conductors, as well as the forward and return coolant conduits, are arranged in a common vacuum casing, as it is the case in other known power line systems, one part of the precedingly discussed disadvantages is eliminated. In such arrangements, however, other disadvantages appear, such as a very complicated structure and the unsuitability of the individual components for mass production. In known power line systems of this type a great number of tubular conduits and electric conductors have to be crowded in a narrow space in such a manner that a good electric and thermal insulation is nevertheless ensured even under extreme temperature changes and alternating mechanical stresses.

The complicated spacers and guides increase the heat effects and the flow losses of the coolants. Both factors necessitate an increase in the number of refrigerating machines and an increase in the required cooling output. Furthermore, the manufacture and installation of such a power line system was found to be very difficult. Further, it is impossible to perform repairs, such as an elimination of a leak in the vacuum system, without causing consequential disturbances by such intervention.

OBJECTS AND SUMMARY OF THE INVENTION

It is an object of the invention to provide an improved power line system for the transmission of electric energy over low temperature conductors (including the state of superconductivity) permitting a heat transmission and thus the cooling of the tubular conduits combined with or containing the electric conductors and the cooling of the tubular conduits connected with one or more radiation shields in a heat conducting manner by means of a single refrigerating machine and a single coolant, whereby the conduit system for the coolant has a substantially simplified and hence more economical structure.

It is a further object of the invention to provide an improved power line system of the aforenoted type wherein the flows of coolant for the cooling of the electric conductors as well as the flows of coolant for the cooling of the radiation shields may be optimalized independently from one another as a function of operating temperatures, coolant flow rate and flow direction, whereby simultaneously the cold surfaces and the heat effects are reduced and, by shortening of the flow paths, the flow losses are diminished.

Briefly stated, according to the invention, in a power line system of the aforeoutlined type, the flow rate of the coolant for cooling the conduits associated with the electric conductors, as well as the flow rate of coolant for cooling the conduits associated with the radiation shields, are not equalized when viewed individually at a desired cross-sectional area passing through the totality of the tubular conduits for the cooling of the electric conductors and through the totality of the conduits for the cooling of the radiation shield. In such power line systems known structural components and equipment may be used. One part of the coolant flow is, after passing through at least one portion of the power line system for cooling the electric conductors, increased to the temperature necessary to cool the radiation shield and/or one part of the coolant flow is, after passing through at least one portion of the power line system for cooling the radiation shield, decreased to the temperature necessary for the cooling of the electric conductors. In this manner it is achieved that the forward and/or return transmission of each partial coolant stream is effected under changed thermodynamic conditions. In both cases the operating temperatures will be optimal; i.e., they are elevated to an optimal value in conduits associated with the radiation shield and they are lowered to an optimal value in conduits associated with the electric conductors.

ADVANTAGES AND GENERAL DESCRIPTION OF EMBODIMENTS AND CHARACTERISTICS OF THE INVENTION

According to an embodiment of the invention, the refrigerating machines are so connected in the coolant conduit system that a partial flow of the coolant emerging from a refrigerating machine enters all the conduits associated with or containing the electric conductors and other part of the same stream enters all conduits that are in heat-conducting relationship with the radiation shield. All these conduits form part of that portion of the power line system which join an adjacent refrigerating machine in the direction of planned flow. Subsequent to passing through the aforenoted power line portion, both partial coolant flows enter the last-named adjacent refrigerating machine in the direction of flow.

According to another embodiment of the invention, the refrigerating machines are so connected in the coolant conduit system that the coolant emerging in partial flows enters both a part of the tubular conduits associated with or containing the electric conductors and a part of the tubular conduits in a heat-conducting relationship with the radiation shield. The coolant enters the conduits at those ends of conduit system portions which join a refrigerating machine. Therefrom the coolant flows to the adjoining refrigerating machines connected with the other ends of conduit system portions. At the same time, one portion of the coolant emerging from the adjacent refrigerating machine enters as a partial flow, both the remainder of the tubular conduits associated with or containing the electric conductors and the remainder of the tubular conduits which are in heat-conducting relationship with the radiation shield. Thus, the last-named partial flows return into the refrigerating machine from which the first-named partial flows emerge and they do so as a counterflow with respect to these first-named partial flows.

Dependent on the prevailing conditions, it may be expedient to arrange the beginning and the end of the power line system in such a manner that they coincide and thus a closed loop system is formed wherein the coolant flow passes through the conduit system between adjacent refrigerating machines without additional return flow conduits. Such an arrangement is advantageous in that the number of the necessary tubular conduits may be lowered to a minimum, thus obtaining a particularly simple structure. It is a further advantage of this arrangement that the direction of flow of the coolant in the radiation shield and in the conduits containing the electric conductors may be freely selected if the power line system is installed as a closed loop system. Thus, in case of a disturbance — for example, in case of a breakdown of a portion of the closed loop system — or in case of an increase in the output requirement accompanied by a requirement for an increase in the coolant quantities for a conduit portion between the refrigerating machines, a partial return of the conduit is possible under changed thermodynamic conditions adapted to the requirements and thus the remaining portion of the conduit system may continue its operation in the desired manner.

Instead of arranging the power line system as a closed loop system it may be built in such a manner that the beginning and the end thereof are at a distance from one another. In such a case the refrigerating machines are so connected to the coolant conduit system that between adjacent refrigerating machines circulating flows are formed with the partial flows emerging from and entering the refrigerating machines and flowing through those portions of the conduit system that interconnect the refrigerating machines. The coolant, entirely or partially, flows with the required cooling temperatures through the conduits associated with or containing the electric conductors and through the conduits associated with the radiation shields. In this manner the coolant passes through the conduits containing the electric conductors and the conduits connected in a heat-conducting manner with the radiation shield, preponderantly in a counterflow. This is advantageous because between each adjacent refrigerating machine circuits may be formed with the partial streams that flow in the conduits interconnecting such refrigerating machines and emerging therefrom and entering thereinto. Such circuits may be formed as a partial or complete forward and/or return flow of the coolant and under accordingly changed thermodynamic conditions.

The partial flows of the coolant emerging from the refrigerating machines are in a counterflowing heat-exchange in different temperature ranges with the partial flows entering the refrigerating machines after passing through the corresponding conduit sections. The conduit which pertain to the individual power line portions and which cool the electric conductors and which, for cooling the radiation shield, are in a heat conducting relationship with the latter, serve for the forward, as well as for the return delivery for the coolant between two adjacent refrigerating machines. The conduits are connected with the refrigerating machines in such a manner that the outflowing coolant enters the tubular conduits divided into partial streams of different temperatures and the coolant emerging from the tubular conduits enters the refrigerating machine as a combination of partial flows of different temperatures.

The distance between the refrigerating machines is determined as a function of the heat generated in the electric conductors, other heat effects, flow losses, as well as the pressure drop in the conduits through which the coolant flows and which serve for the cooling of the electric conductors and radiation shields.

It has already been proposed to arrange along a linear power line system for the transmission of electric energy several refrigerating machines and to use the tubular conduits containing the electric conductors as forward and return coolant conduits between adjacent refrigerating machines. Such systems are described, for example, by D. A. Swift in Paper No. 1.46 of the 12th International Congress of Refrigeration held in Madrid in 1967 and by an article starting on page 238 in the August 1968 issue of Cryogenics. The coolant emerging from the refrigerating machine is divided into two partial streams and passes through the conduits of the two adjoining conduit portions. Thereupon the partial streams are submitted to a cooling process in the adjacent refrigerating machines and subsequent to their exit from these two refrigerating machines, they are in the same manner divided and returned to the first refrigerating machine. The metallic cooling tubes, which form the electric conductors, are used between two adjacent refrigerating machines as forward and return conduits. The flow rate through any cross-sectional area of the tubular conduits is thus equalized and they have the same operating temperature. The conduit cross sections are so chosen that in case of an identical flow rate through the forward and return conduits, between the coolant flow emerging from the first refrigerating machine and the coolant flow entering the respective adjoining refrigerating machines, identical temperature differences prevail. In such a system solely the electric conductors are cooled while for the cooling of the radiation shield a separate cooling system has to be provided which operates at a higher temperature level and is associated with separate refrigeration machines. Consequently, the power line system precedingly described substantially has the same disadvantages as the power line systems known heretofore, while the power line system according to the invention has the advantage that for the cooling of the electric conductors and the radiation shield only a sole coolant circuit is necessary.

A particularly advantageous arrangement of the coolant conduits of the power line system is provided if one part of the coolant leaves one of the refrigerating machines with a temperature $T_1$ while the other portion emerges therefrom with a temperature $T_3$ (which is higher than $T_1$). The partial stream having temperature $T_1$ enters, subsequent to cooling the conduits associated with the electric conductors, with a temperature $T_2$ (which is higher than or equal to $T_1$), the refrigerating machine which is next in the direction of flow. The partial stream having a temperature $T_3$ enters, subsequent to cooling the radiation shield, with a temperature $T_4$ (which is higher than or equal to $T_3$) the refrigeration plant next in the direction of flow. In the heat exchangers of this refrigerating machine there occurs, between the partial streams of the coolant emerging from the refrigerating machine, a heat exchange in such a manner that the entering partial streams are combined only after the partial stream having the lower temperature is in a counterflow with the corresponding emerging partial stream, heated to approximately $T_4$. The power line system according to the invention thus has the advantage that the mass flow passing in one direction through any cross-sectional area of the tubular conduits for the electric conductors and the tubular conduits for the radiation shield does not have to be the same as the oppositely directed mass flow; rather, the mass flows may be adapted to the operational requirement for optimalizing the cooling.

It is further achieved that for the heat transmission in the entire system only a single coolant is used and further, between two adjacent portions of the power line system only a single refrigerating machine has to be installed. Also, the operating temperatures of the partial streams emerging from the refrigerating machines an having different cooling functions (that is, the cooling of one or more radiation shields and the cooling of the tubular conduits containing the electric conductors), may always be selected at an optimal value. In case the power line system is of the type in which the beginning and the end do not coincide, at least one partial stream is directed in counterflow with respect to the other partial streams in the conduit system.

It is a further advantage of the invention that dependent upon requirements, the power line system may be composed of coaxially or axially parallel disposed conduits. Or, the arrangement of the conduits in the system may be a mixture of the two. For this purpose only a minimum number of tubular conduits are necessary, so that the power line system according to the invention may be made in an economic manner. Also, because of the small number of tubular conduits and structural elements, the risk of malfunctioning is significantly reduced. The thermal insulation between forward and return coolant conduits, which has been a necessary component in power line systems known heretofore in order to cool long cable portions from the ambient temperatures to the low operating temperatures, may now be largely omitted.

If in the coolant conduit in the one direction the flow passage section is the same as for the forward and return conduit combined, then, in the case of equal absolute mass flow rate, that is, under identical cooling capacity, the flow resistance is reduced because of the reduction in the inner surfaces and further, there is a reduction in the frictional heat generated by the flow resistance and also a reduction in the pressure drop per unit length. The decrease of these magnitudes permits to cool longer cable portions with smaller refrigerating machines whereby investment and operational costs are lowered with respect to cables having forward and return conduits for the coolant. Because of the omission, particularly in a closed loop conduit system, of the insulation between forward and return coolant conduits and because of the simpler geometrical arrangement of the tubular conduits, a decrease in the cold surfaces is obtained, resulting in a decrease of heat effects. Thus, in addition to a decrease in flow losses, the refrigeration output may also be lowered.

The invention will be better understood from the ensuing specification of several embodiments for practicing the invention, taken in conjunction with the drawing.

BRIEF DESCRIPTION OF THE DRAWING

FIG. 2 is a schematic view along line II—II of FIG. 1;

FIG. 3 is a schematic view of a power line system with partial or complete coolant return flow through the conduits containing the electric conductors; and FIG. 4 is a schematic representation of a power line system with partial or complete coolant return flow through conduits in a heat-conducting relationship with the radiation shield associated with the conduits.

DETAILED DESCRIPTION OF THE EMBODIMENTS

Figure 1:
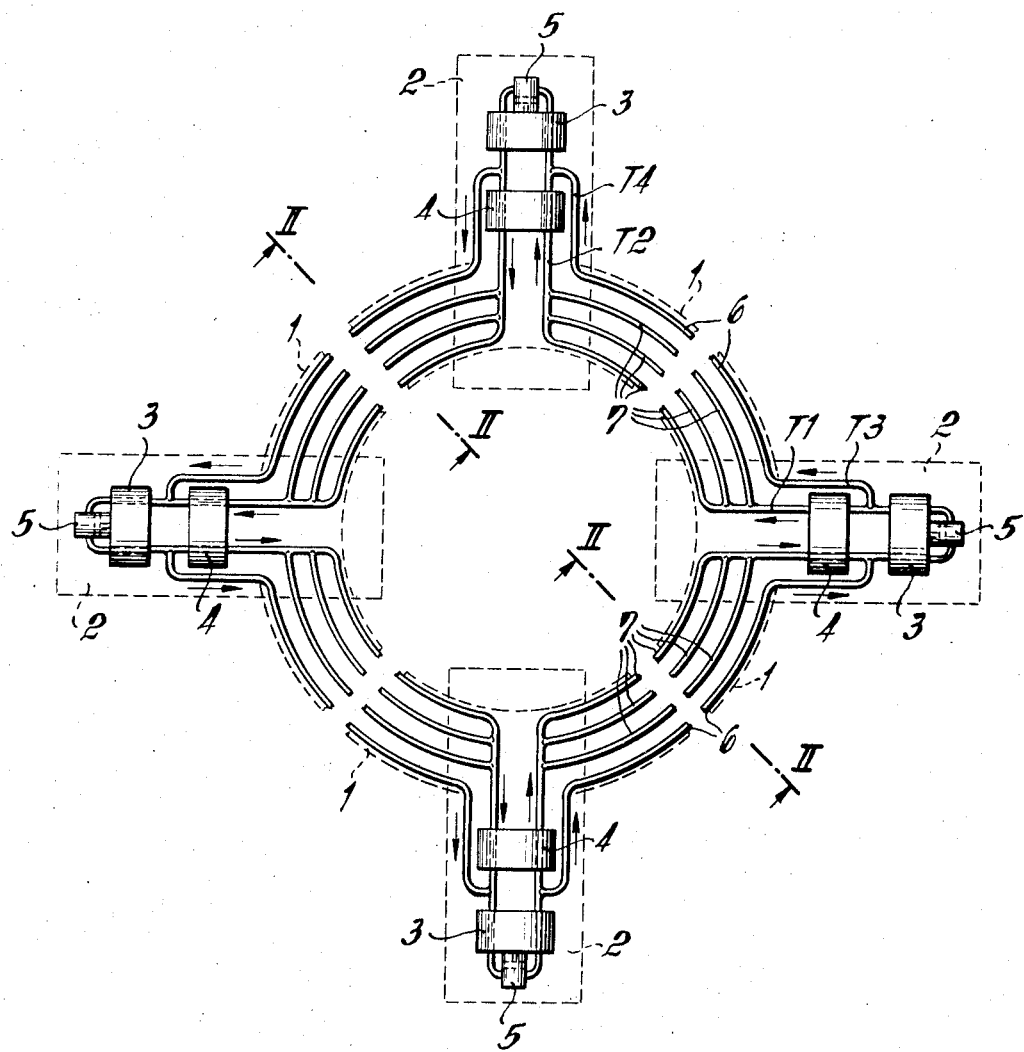
FIG. 1 is a schematic view of a closed loop system for practicing the invention.

For simplifying the illustration of the power line systems according to the invention, the vacuum casing is not illustrated in the figures. Furthermore, the radiation shields, which are in general disposed between the cooled radiation shield 1 and the vacuum casing and which consist preferably of highly insulating material as well as the devices known per se for heating or cooling the partial coolant streams to be transmitted under changed thermodynamic conditions, are also not shown.

As seen in the figures, the coolant flows through the refrigerating machines 2 disposed at predetermined distances. The principal components of each refrigerating machine are the heat exchangers 3 and 4, an expansion device (not shown in the figures) and a compressor 5. The coolant is pressurized in compressors 5 and thereafter, prior to being admitted to the tubular conduits 6 and 7, passes through the heat exchangers 3 and 4, and the expansion stages of the expansion devices in which it is cooled. In the embodiments shown in the figures, only a partial stream of the coolant emerging from the refrigerating machine is cooled to the very low temperature $T_1$. This partial stream flows through the tubular conduits 7 with the temperature $T_1$ for cooling the electric conductors 8. It is to be understood that it is feasible to combine the several tubular conduits 7 into a single coolant conduit.

After the coolant has passed through a conduit portion between two refrigerating machines, it enters in the direction of flow with a temperature $T_2$ into the adjacent refrigerating machine 2 and passes therein through heat exchangers 4 and 3. At the same time, the coolant is drawn by the compressor 5 of the refrigerating machine 2 and the warmer coolant flowing from the compressor 5 is cooled by means of the colder coolant entering the refrigerating machine. For the cooling of radiation shield 1, between the heat exchangers 3 and 4 the other partial stream of the coolant is branched off at a temperature $T_3$ and introduced into the conduits 6 which are in a heat-conducting relationship with the radiation shield 1. The several tubular conduits 6 may be also combined into a sole tubular conduit.

In the embodiment according to FIGS. 1 and 2, the partial stream flows through the conduits 6 in the direction of the refrigerating machine 2 through which simultaneously passes the partial stream for serving the tubular conduits 7. The partial stream admitted to a refrigeration apparatus from the conduits 6 enters — as seen in the drawing — between the heat exchangers 4 and 3 into the heat exchanger 3 with a temperature $T_4$. At the same time, it is combined with the partial stream which is admitted to the refrigerating machine from the conduits 7.

In contradistinction to the flow directions of the coolants shown in FIGS. 1 and 2, these coolants may be transmitted in mutually opposite directions in the conduits for the cooling of the radiation shield, and in the conduits for the cooling of the electric conductors.

In case a partial return delivery of the coolant is to be effected — as it is advantageous in some cases — then — as seen in FIG. 3 — the partial stream of the coolant emerging from the heat exchanger 4 with temperature $T_1$ is divided in such a manner that at least one of the tubular conduits 7 contains a coolant flow in an opposite direction. It is to be understood that by means of the conduit system according to the invention, arrangements for the coolant delivery are possible in which the at least partial coolant return delivery occurs at a temperature which is higher than that necessary for cooling the electric conductors during operation. This may be achieved — as shown in the embodiment according to FIG. 4 — by providing that of the two or more conduits 6 connected with the radiation shield 1, in at least one there is an opposite coolant flow. For this purpose the refrigerating machines 2 of the power line system are arranged according to the invention in such a manner that the coolant quantities passing through the refrigeration apparatus from the adjacent conduit portions with temperatures $T_2$ and $T_4$ are so selected that the inflowing and outflowing coolant quantities for each heat exchanger 3 are of equal magnitude. Thereby it is achieved that the refrigerating machines 2, despite the difference between the quantities of the coolant admitted to the conduits 6 for the cooling of the radiation shield 1 and the conduits 7 for the cooling of the electric conductors 8, may be operated in a very economical manner.

That which is claimed is:

1. A method of circulating coolant in a power line system wherein electric energy is transmitted over cooled electric conductors, said power line system includes coolant conduits associated with said electric conductors for cooling the latter and coolant conduits associated with a radiation shield for cooling the latter, a vacuum casing containing said conduits, said electric conductors and said radiation shield, with said power line system there are associated refrigerating machines having compressor means, expansion means and heat exchanger means, comprising the steps of A. maintaining unequalized the flow rate of the coolant through any cross-sectional area laid across the totality of the conduits for cooling the electric conductors, B. maintaining unequalized the flow rate of the coolant through any cross-sectional area laid across the totality of the conduits for cooling the radiation shield, C. increasing to the temperature value necessary for the cooling said radiation shield, the temperature of a partial stream of the coolant subsequent to its passing through at least one portion of the power line system for cooling the electric conductors, and D. decreasing to the temperature value necessary for the cooling said electric conductors, the temperature of a partial stream of the coolant subsequent to its passing through at least one portion of the power line system for cooling the radiation shield.

2. A method as defined in claim 1, including the step of admitting a partial stream of a coolant emerging from a refrigerating machine to all those conduits associated with the electric conductors and to all those conduits associated with the radiation shield which form a portion of said power line system that joins a refrigerating machine in the planned direction of coolant flow and admitting both last-named partial streams to the downstream successive refrigerating machine after flowing through said last-named portion of the power line system.

3. A method as defined in claim 1, including the following steps:

A. admitting the coolant, emerging as partial streams, both to one part of those conduits associated with the electric conductors and to one part of those conduits associated with the radiation shield which form the ends of portions of said power line system; said ends joining a refrigerating machine, B. subsequently directing said coolant to those downstream adjacent refrigerating machines which are connected with the other ends of said last-named portions of said power line system; and C. admitting a partial stream of the coolant, emerging in partial streams from the adjacent refrigerating machines, both to the remaining part of those conduits associated with the electric conductors and to the remaining part of those conduits associated with the radiation shield which form portions of the power line system; the partial streams of the last-named step (B) return in a counterflow with respect to the partial streams of the last-named step (A) to the refrigerating machine from which emerge the last-named partial streams.

4. A method as defined in claim 2, directing the coolant, with the absence of return flow, to successive downstream refrigerating machines in a closed loop power line system.

5. A method as defined in claim 3, including the following steps:

A. providing, between adjacent refrigerating machines, a circulating flow of the partial coolant streams passing through those portions of the power line system which extend to and from the refrigerating machines and which interconnect the same and B. giving the coolant flowing through conduits associated with the electric conductors and the coolant flowing through conduits associated with the radiation shield the required operating temperatures in the refrigerating machines for cooling the electric conductors and the radiation shield.

6. A method as defined in claim 1, including the following steps:

A. admitting a first partial coolant stream with a temperature $T_1$ from one of the refrigerating machines into conduits associated with the electric conductors, B. admitting a second partial coolant stream with a temperature $T_3$ from the same refrigerating machine into conduits associated with the radiation shield; the temperature $T_3$ is higher than the temperature $T_1$, C. admitting said first partial coolant stream with a temperature $T_2$ to the downstream adjacent refrigerating machine subsequent to its passing through the conduits associated with the electric conductors; the temperature $T_2$ is higher than the temperature $T_1$, D. admitting said second partial coolant stream with a temperature $T_4$ to the downstream adjacent refrigerating machine subsequent to its passing through the conduits associated with the radiation shield; the temperature $T_4$ is higher than the temperature $T_3$, E. directing in a heat exchanging counterflow the partial coolant streams in the heat exchangers of the last-named refrigerating machine, and F. combining the entering, partial coolant streams after the colder partial stream is warmed to a temperature $T_4$ in step (E).

* * * * *